(12) United States Patent
Von Seidel

(10) Patent No.: US 7,504,749 B2
(45) Date of Patent: Mar. 17, 2009

(54) SWITCH AND SYSTEM FOR CONTROLLING ELECTRIC LOADS

(76) Inventor: Michael Von Seidel, 10 Leccino Terrace, Bakkershoogte, Somerset West, Western Cape Province, 7130 (ZA)

(*) Notice: Subject to any disclaimer, the term of this patent is extended or adjusted under 35 U.S.C. 154(b) by 412 days.

(21) Appl. No.: 10/585,893

(22) PCT Filed: Nov. 1, 2004

(86) PCT No.: PCT/IB2004/003554
§ 371 (c)(1), (2), (4) Date: Jul. 11, 2006

(87) PCT Pub. No.: WO2005/076432
PCT Pub. Date: Aug. 18, 2005

(65) Prior Publication Data
US 2008/0218003 A1    Sep. 11, 2008

(30) Foreign Application Priority Data
Jan. 11, 2004    (WO) ................. PCT/IB2004/000025

(51) Int. Cl.
*H01H 35/00* (2006.01)
(52) U.S. Cl. .................... 307/131; 392/464; 340/693.3
(58) Field of Classification Search .............. 307/131; 340/693.3; 392/464
See application file for complete search history.

(56) References Cited

U.S. PATENT DOCUMENTS 2,388,564 A    11/1945 Osterheld
4,272,687 A *    6/1981 Borkan ................ 307/115
5,315,531 A *    5/1994 Oravetz et al. .......... 702/62

(Continued)

FOREIGN PATENT DOCUMENTS

WO    WO 02/08673    1/2002

OTHER PUBLICATIONS

Freudenberg, Charger Control for the Hot Water Tank, Sep. 26, 1986, The Institute of Engineering and Technology, 1987006, pp. 70-72.*

*Primary Examiner*—Michael J Sherry
*Assistant Examiner*—Daniel Cavallari
(74) *Attorney, Agent, or Firm*—Meyertons, Hood, Kivlin, Kowert & Goetzel, P.C.; Eric B. Meyertons

(57) ABSTRACT

An electrical switch unit (1, 60, 61, 70) is provided for controlling the supply of electrical energy to an appliance (7, 65) that also has its own electrical control switch (38), in particular a water heater. The switch unit has a normally open load switch operatively closed by a electronic timer means, and a bypass detector circuit (25) is connected in parallel across the load switch so as to become energized when the electrical control switch of a connected appliance is closed. The timer means is operative to become activated consequent on the initiation of current flow through the detector circuit to effect closure of said load switch after a predetermined optionally adjustable time delay (that is independent of real-time), and to maintain the load switch in a closed condition for a time period after which the load switch is returned to its normally open condition. The invention extends to an electrical distribution box including such a switch and the switch may have a current sensor for association with otherwise independent electrical conductors serving other appliances to disable the timer if no other appliance is operative.

14 Claims, 8 Drawing Sheets

U.S. PATENT DOCUMENTS

| | | | |
|---|---|---|---|
| 5,642,004 A * | 6/1997 | Bircher | 307/66 |
| 5,875,087 A * | 2/1999 | Spencer et al. | 361/87 |
| 6,208,806 B1 | 3/2001 | Langford | |
| 7,394,397 B2 * | 7/2008 | Nguyen et al. | 340/693.3 |
| 2003/0169545 A1 * | 9/2003 | Tallman et al. | 361/42 |
| 2003/0214819 A1 * | 11/2003 | Nakagawa | 363/20 |
| 2005/0060107 A1 * | 3/2005 | Rodenberg et al. | 702/62 |
| 2005/0237036 A1 * | 10/2005 | Nguyen et al. | 323/247 |

* cited by examiner

SWITCH AND SYSTEM FOR CONTROLLING ELECTRIC LOADS

FIELD OF THE INVENTION

This invention relates to a switch and system for controlling electrical loads at a domestic or small user level in a simple, yet highly effective manner.

More particularly, but not exclusively, the invention is concerned with reducing peak electrical loads and enabling electrical power consumption by electrical appliances to be delayed until a later time for reasons such as taking advantage of lower off-peak rates and avoiding overloading of any particular power circuit unnecessarily.

BACKGROUND TO THE INVENTION

Suppliers of electrical energy experience, on a daily basis, an overall demand for electrical energy that has peak periods and off-peak periods. Typically, in a domestic situation, there would be two peak periods each day. The first is in the morning corresponding to people arising, taking a shower or bath, using stoves and kettles in order to have breakfast and possibly turning on electrical heaters in cold weather, prior to going to work. The other peak period takes place in the evening when people return from work, use cooking appliances in order to prepare the evening meal, take a shower or bath and possibly use electrical heaters or air conditioners, as the case may be. In addition, there may be the use at these times of other appliances such as washing machines, tumble driers and dishwashers, all which consume considerable electrical energy.

Clearly, the infrastructure of an electrical energy supply system must be able to cope with the peak period demand and, accordingly, at off-peak periods, there is generally surplus capacity.

Electrical storage type of water heaters contribute significantly to peak loads as their thermostats switch on soon after a supply of hot water has been withdrawn from a hot water storage tank forming part of the water heater. Numerous different systems and proposals have been put forward in order to try and control the times at which water heaters draw electrical energy from the electrical supply system and many are in practical use.

One approach has been for a central control facility to communicate with switching arrangements associated with remote water heaters by way of signals transmitted over the electricity supply grid; over telephone lines; or by way of wireless communication. These arrangements are expensive; require ongoing management; and may not be appropriate to less sophisticated installations.

Another approach has been to use real-time time switches for restricting water heaters to operation during off-peak times. Whilst, in theory, this arrangement operates effectively, it has certain drawbacks including the fact that real-time timers are generally costly and generally do not keep the time of day indefinitely, needing to be reset periodically, particularly if there has been an interruption in the supply of electrical energy. Timers with a so-called reserve or back-up to energize them during supply interruptions so that they maintain the correct time are even more costly.

Accordingly, whilst enjoying certain popularity, applicant believes that the use of such real-time timers is not sufficiently widespread to assist the suppliers of electrical energy to any substantial extent, at least in many different electrical supply regions. Also, this system is inappropriate in unsophisticated systems because of the necessity that the electrical energy drawn during peak periods be distinguished by a real-time clock from electrical energy drawn during off-peak periods or, a real time based formula needs to be actively applied by somewhat sophisticated metering equipment.

Other rather sophisticated computer controlled techniques have also been developed in an attempt to monitor, predict, and control the electrical energy consumed, for example, by a household or other consumer. U.S. Pat. No. 6,208,806 to Langford is an example of such a control system. Numerous other computer based systems have been proposed. All of these are complicated, expensive, and inappropriate to numerous unsophisticated electrical supply grids.

As regards unsophisticated electrical supply installations, it is also often a problem that one particular electrical circuit has insufficient capacity to operate two or more appliances simultaneously and there is a danger that the circuit becomes overloaded.

OBJECT OF THE INVENTION

It is an object of this invention to provide a somewhat simple switch unit; an installation including such switch unit; and a system, whereby the consumption of electrical energy by water heaters or some other electrical appliances using relatively heavy currents, can be reduced during peak load times and transferred to other times.

SUMMARY OF THE INVENTION

In accordance with one aspect of the invention there is provided an electrical switch unit for controlling the supply of electrical energy to an appliance that also has its own electrical control switch for controlling operation of the appliance, the switch unit having a live, a neutral or earth terminal, or both, for operative connection to an electrical power supply; at least a load output terminal for operative connection to an electrical appliance; an electrically or electronically operated load switch connected between the live input and load output terminals for opening and closing a load circuit between said live input and said load output terminals, and an electronic circuit embodying timer means for controlling the load switch, the switch unit being characterised in that the load switch is a normally open switch operatively closed by the electronic circuit, and in that a bypass detector circuit is connected in parallel across the load switch, the timer means being operative to become activated consequent on the initiation of current flow through the detector circuit to effect closure of said load switch after a time delay (that is independent of real-time), and to maintain the load switch in a closed condition either for a predetermined optionally adjustable time period or until current flow through the detector circuit ceases after which the load switch is operatively returned to its normally open condition.

Further features of the invention provide for the time delay to be predetermined optionally adjustable and optionally variable according to surrounding circumstances; for the predetermined optionally adjustable time delay to be from about one to about six hours, preferably from about two to about five hours with a preferred timer means being adapted to provide a manually operable selection between two, three, or four different time delays; for the said predetermined optionally adjustable time period for which the load switch is maintained in a closed condition to be from about one to about four hours; for the switch unit to have associated therewith a current sensor for sensing current in one or more conductors not associated directly with the output load terminal such that activation of the timer means to time out said optionally adjustable time delay is, after an optional initial shorter time delay, replaced by immediate closure of the load switch in circumstances in which the current sensor fails to sense a current above a predetermined base level in said one or more conductors not associated directly with the output load terminal; for the current sensor either to be attached to the switch unit by way of a flexible lead that enables the current sensor to be associated with said one or more conductors a short distance from the switch unit or to be embodied in the same or a juxtaposed housing as the switch unit with either a conductor passing between an input terminal and an output terminal or a passage way through the housing for accommodating a load carrying conductor forming part of an electrical installation in an electrical distribution board so that the current sensor senses current in said conductor; for the timer means to be adapted to apply a time delay that is dependent, at least partly, on whether or not the current sensor senses a current in said conductor at one or more selected time intervals after current is initially detected in the detector circuit; and for a manually operable override switch to be associated with the switch unit to enable the said predetermined time delay to be selectively bypassed manually to enable a single cycle of closure of the load switch and reopening thereof to take place.

It is to be mentioned that the purpose of the current sensor and such initial shorter time delay is to enable a maintenance heating cycle of a water heater to take place earlier in the event that no other significant power is being drawn at that time whilst maintaining independence of the switch unit and system from real-time. The significance of this will become more apparent from what follows.

In one particular application of the invention, the switch unit is adapted to be installed in an electrical distribution board in series with an electrical switch, in particular an isolator, connected to supply electricity to an electrical water heater having its own thermostatically operated electrical control switch. The switch unit has associated therewith said current sensor that is to be operatively associated with one or more electrical conductors in the distribution board that are connected to one or more other power circuits in the electrical installation or even with a main conductor feeding electrical energy from a main switch or earth leakage unit to a busbar feeding electrical energy to a series of circuits, generally by way of individual trip switches to which the busbar would typically be connected directly. In such an application the switch unit preferably has a housing that is configured, particularly in side elevation, for support in juxtaposed relationship relative to a series of electrical control switches, and in alignment therewith. Such control switches generally include a main switch, an earth leakage unit, one or more water heater switches or isolators, and a series of trip switches.

In this regard, a second aspect of the invention provides an electrical distribution board including a switch unit as defined above and operatively connected as indicated.

In a second application, the switch unit is configured as a separate plug-in unit to an electrical power outlet socket to interface between the socket and a plug for supplying electrical energy to an appliance in which case it has conductive pins for cooperation with the power outlet socket on one face and a socket on another face for receiving electrically conductive pins of a plug associated with an appliance.

In a third application, the switch unit is built into either a flush or surface mounted electrical power supply outlet socket.

In accordance with a another aspect of the invention there is provided an electrical supply system in which a multitude of consumers are supplied from an electrical supply company or electrical supply grid and wherein at least a proportion of the consumers has premises having an electrical installation in which there is embodied at least one switch unit as defined above operatively connected into the electrical supply to an electrical water heater.

In order that the above and other aspects and features of the invention may be more fully understood an expanded description of various embodiments and applications of the invention follows with reference to the accompanying drawings.

DETAILED DESCRIPTION WITH REFERENCE TO THE DRAWINGS

Figure 1:
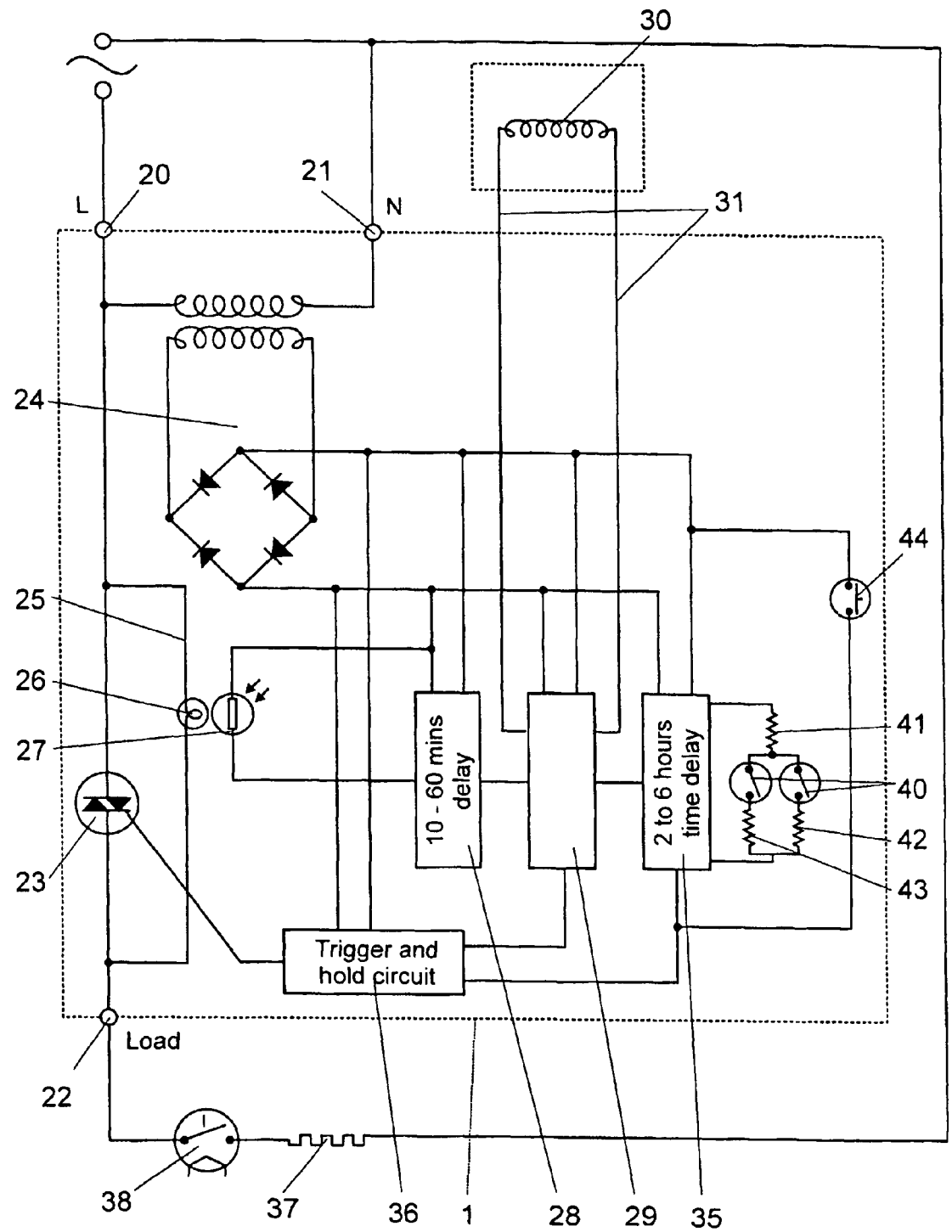
FIG. 1 is a circuit diagram of an embodiment of the invention particularly directed at use in relation to water heaters.
Figure 3:
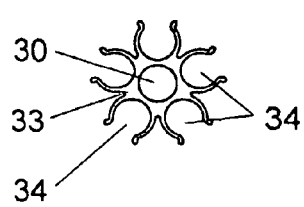
FIG. 3 is an end view of one form of clip unit that may be employed for attaching the current sensor to a plurality of power conductors.
Figure 4:
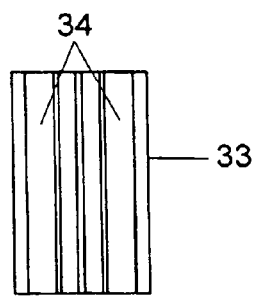
FIG. 4 is an elevation of the clip unit.
Figure 2:
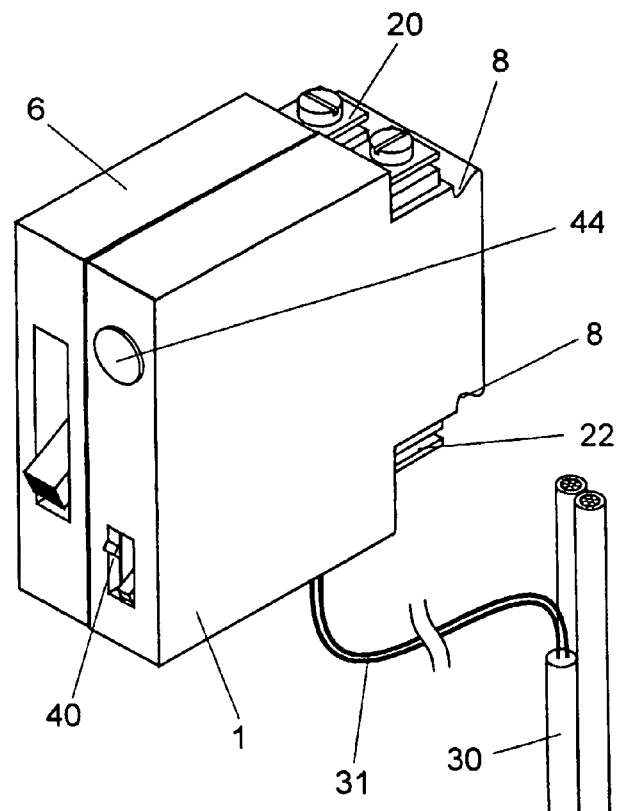
FIG. 2 is an isometric illustration of a switch unit in juxtaposed relationship relative to an associated isolator switch and illustrating one form of current sensor in association with two other power conductors.
Figure 5:
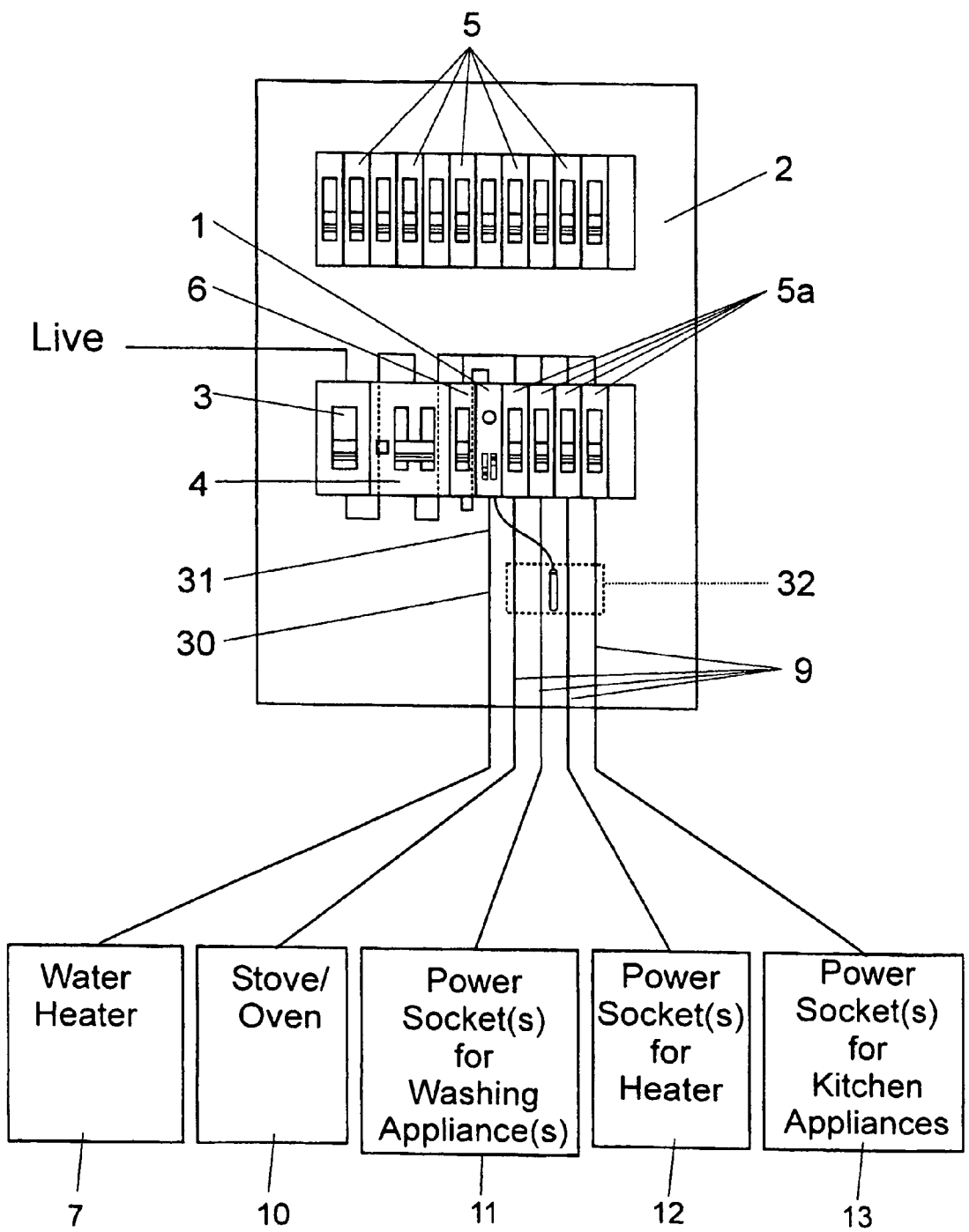
FIG. 5 is a diagrammatic front view of an electrical distribution board fitted with a switch unit according to the invention.

In the application of the invention illustrated in FIGS. 1 to 6 of the drawings, a switch unit according to the invention, generally indicated by numeral (1), is configured, as illustrated in FIGS. 2 and 5, to fit in with other control switches in a distribution board (2) that include a main switch (3), an earth leakage unit (4), a series of trip switches (5), and an isolator switch (6) for supplying electrical energy to an electrical water heater (7).

As shown most clearly in FIG. 2, the switch unit (1) of the invention is configured to fit side by side with the other control switches and, to this end, is shaped substantially identically to the other control switches, in side view. Such shape may include notches (8) at the rear whereby the switches can be releasably clipped to a support panel of the distribution board.

Particular trip switches (indicated by numeral (5*a*)) are connected by means of conductors (9) to appliances or power sockets for appliances of a nature utilizing appreciable electrical energy such as an electrical stove/oven (10); washing appliances (11); electrical heaters (12); and power sockets for kitchen appliances (13) such as kettles and the like.

In a typical domestic situation, in which occupants of premises arise in the morning, go to work, and return in the evening, more than one power consuming appliance is regularly utilized within a time period during which the power supply circuit to an electrical water heater closes in response to the entry of cold water into the water heater. The switch unit of this invention is aimed at reducing the peak load of each composite domestic installation in the manner indicated with a consequent reduction in the combined overall peak load. The extent of the reduction will depend in each case on the extent of usage of switch units of the invention.

Turning now to the circuit illustrated in FIG. 1, the switch unit has a live input terminal (20), a neutral input terminal (21), and a load output terminal (22). The live input terminal and load output terminal are interconnected through a normally open load switch that, in this case, assumes the form of a triac (23) the gate of which is controlled by an electronic circuit based almost exclusively on timer means. The electronic circuit is energized by a built-in d.c. power supply (24).

A bypass detector circuit (25) is connected in parallel across the triac and includes, in this case, a radiation emitting element such as a light bulb (26) that is typically a common pilot bulb, that cooperates with a detector, in this case a light sensitive resistor (27). The light sensitive resistor, upon being energized by the light bulb, is adapted to trigger a timer means that in effect consists of two separate timers and a trigger and hold circuit that will be further described below. The electronic circuit can be manufactured or assembled in any manner and, obviously, the separate functions described as pertaining to separate timers and the analyser circuit, can be integrated in any way, it being the function performed that is of importance. Nevertheless, for purposes of ease of description, the electronic circuit will be described as being composed of separate parts being the various timers, the analyser circuit, and the trigger and hold circuit in spite of the fact that these parts will undoubtedly be integrated in practice.

The timer means in this embodiment of the invention includes an initial delay timer (28) (that constitutes said optional initial shorter time delay) that, once triggered by the light sensitive resistor, times out for a relatively short period, of the order of 20 to 60 minutes. This initial delay timer is associated with a simple analyser circuit (29) having an input from a current sensor (30) connected to it.

In this embodiment of the invention the current sensor is connected by way of a flexible lead (31) to the switch unit (1). The current sensor is generally a simple coil and is operatively attached to one or more of the power conductors (9) as indicated by dotted line (32) in FIG. 5. It is envisaged that the sensor may be fixed in a resilient plastics clip (33), typically in the form of a short length of extrusion, that serves to receive the current sensor centrally and has a series of clips (34) radially offset from each other for receiving power conductors therein. The embodiment of clip illustrated in FIGS. 3 and 4 has the facility for clipping up to five conductors to the current sensor.

The analyser circuit (29) is adapted to trigger a main delay timer (35) in the event that current is sensed in the power conductors during the time out period of the initial delay timer (28) over and above a base level that is selected at a level (typically about 1800 watts in a small installation) in order that one or more appliances that needs electrical energy regularly, such as a refrigerator, is not read by the current sensor as a heavy power consuming appliance. The main delay timer then times out for the main time delay of say three, four, or five hours after which it will trigger a trigger and hold circuit (36) that closes the triac to enable the water heater to draw electrical energy. If no such greater than base level current is sensed by the analyser circuit it is adapted to immediately trigger the trigger and hold circuit (36) that closes the gate of the triac.

In either event, once the trigger and hold circuit is triggered, it holds the triac closed either for a predetermined period of time, say two to four hours, being sufficient to enable a water heater to reach its target temperature, or alternatively, and preferably, until such time as the water heater thermostat opens as will be detected by the detector circuit being de-energised and the light bulb (26) going out. Most preferably, in order to protect the water heater should its thermostat fail, the trigger and hold circuit can be arranged to open the triac (23) either when the detector circuit is de-energised, or after a predetermined time period, whichever occurs first. In any event, at this stage the system resets completely.

It will be understood that the load output terminal (22) is, for the aforesaid purposes, operatively connected to a heating element (37) of the water heater by way of a thermostatic control switch (38).

In use, in the normal course of events, a person preparing for the day, or returning at the end of a day may wish to shower or bath and thereby cause the thermostatic control switch, being the appliance's normal electrical control switch, to close and energize the detector circuit (25). This activates the initial time delay (28) by way of the light sensitive resistor and that initial time delay and the current sensor together with the analyser circuit monitors whether the occupant activates other appliances associated with their routine, say for the preparation of food or beverage, heating or cooling, or washing clothing or dishes without the water heater being switched on at all.

If such other appliances are activated within the initial time delay, the main delay timer is activated. If not, the initial delay timer enables the water heater element (37) to be energized immediately at the end of the initial time delay, as would typical of the case in off-peak hours to enable maintenance heating of the water heater to take place.

In this manner, the switch unit of the invention prevents the water heater from becoming energized simultaneously with other relatively heavy power consuming appliances, at least for so long as the main time delay has not yet timed out.

Figure 6:
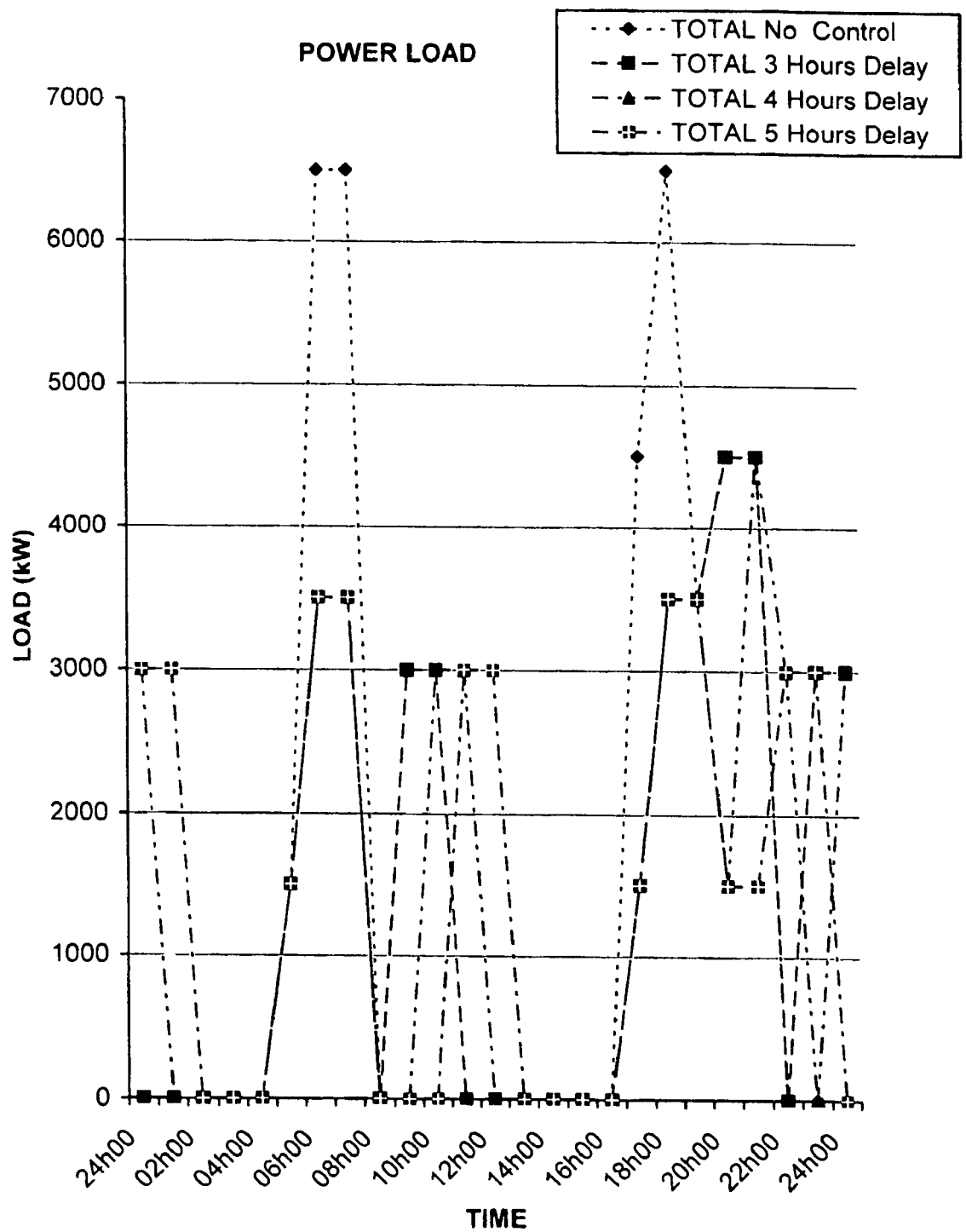
FIG. 6 is a set of graphs aimed at illustrating the decrease in peak load that can be achieved by use of the switch unit according to the invention in a domestic type of electrical supply installation.

In order to demonstrate the efficacy of a switch unit according to the invention, there has been created in FIG. 6 a set of graphs illustrating the effect that is created by a time delay of 3, 4, or 5 hours of allowing a water heater to reheat in winter circumstances in which a heater (2000 W) is run from 05h00 to 08h00 in the morning and 17h00 to 22h00 in the evening; kitchen appliances utilizing say 2000 W are utilized from 06h00 to 07h00 in the morning and 18h00 to 20h00 in the evening; and the water heater would, in the absence of the switch unit, operate from 05h00 to 08h00 in the morning and 17h00 to 19h00 and 20h00 to 22h00 in the evening.

The graphs clearly show that the peak load is 6,500 W both morning and evening with no control; 3,000 watts and 4,500 watts respectively in the morning and evening in the instance of a 3 or 4 hour time delay imposed on the water heater; and 3,500 watts both morning and evening in the instance of a 5 hour time delay imposed on the water heater. Whatever the reality of any particular situation is these simulated results are likely to be fairly representative and like peak load reduction will be achieved in all real life situations.

Of course, it should be noted that in situations in which an advantageous tariff is applicable to off peak times, use of the switch unit will automatically shift at least most, and if not all electrical energy consumed by a water heater into off peak times.

In order to provide flexibility for enabling a selection of time delays to be made, and with reference once more to FIGS. 1 and 2, the main time delay can be provided with a selection of say three different time delays that can be selected utilizing micro-switches (40) accessible at the front of the switch unit. An appropriate circumstances such as the use of resistance/capacitance timer circuits, the two microswitches could be connected in parallel relationship with each other and in series with one resistor (41) and so that the micro-switches operate two parallel [other] resistors (42, 43) so that any one of three different time delays can be selected. These time delays correspond to the sum of the resistance of the resistors indicated by numerals (41) and (42); the sum of resistance of the resistors indicated by numerals (41) and (43); and the sum of resistance of the resistor (41) and the parallel value of resistors (42) and (43) (both micro-switches closed). Of course, the resistor indicated by numeral (41) can be omitted if suitable values for the other two resistors can be chosen to provide the required time delays.

In the case of the use of a pulse generator and counters for the timers, which may be preferable in view of the rather long time delays, other appropriate selector means can be utilised with the manually operable means probably still be microswitches, jumpers or the like.

Still further with a view to flexibility, and in the event that abnormal demands exist for hot water, a manually operable override switch (44) may be provided to enable the main delay timer to be bridged out and the trigger and hold circuit (36) to be triggered immediately so that the water heated can be immediately energized. Of course, thus manual override only operates for a single heating cycle as the active time a resets the system when the load switch opens once more.

It will be understood that numerous variations may be made to the embodiment of the invention described above without departing from scope hereof. In particular, the current sensor could be embodied in the same housing as the switch unit itself with an arrangement for routine a power conductor relative to the housing so that the current sensor operates effectively.

Figure 9:
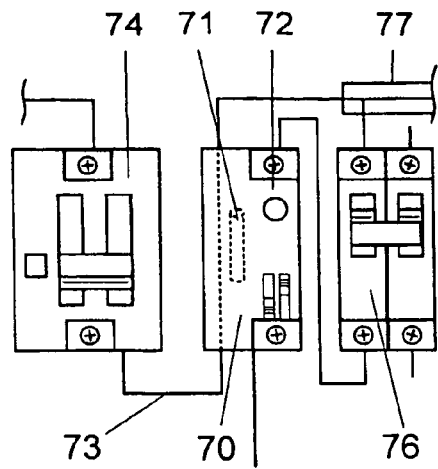
FIG. 9 is an enlarged and partly exploded diagrammatic view showing one electrical connection arrangement within the distribution board illustrated in FIG. 8.
Figure 7:
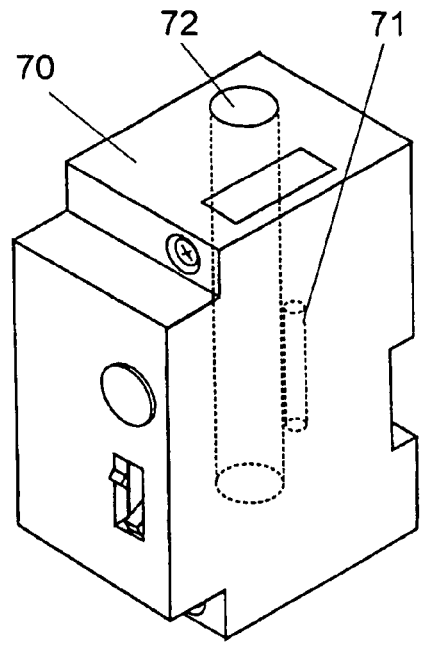
FIG. 7 is an isometric illustration of an alternative switch unit itself embodying a current sensor within its own housing.
Figure 8:
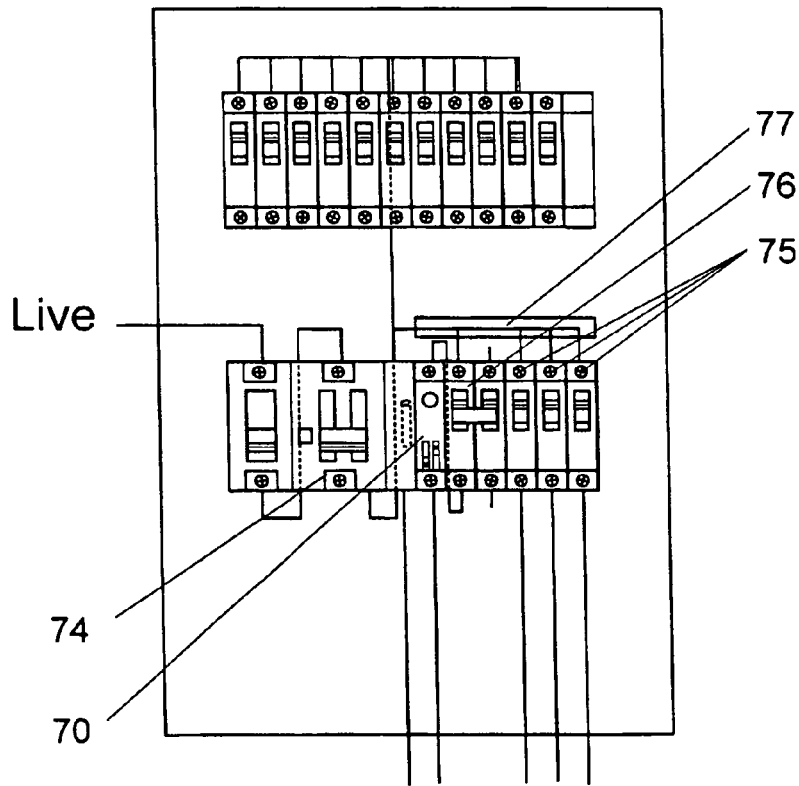
FIG. 8 is a view similar to FIG. 5 but showing the inclusion of the switch unit illustrated in FIG. 7.

Thus, referring to FIGS. 7 to 9 the drawings, a switch unit having a circuit as described above is embodied in a housing (70) and the current sensor (71 is arranged within the housing next to a passage (72) that could be a channel or duct through the housing from top to bottom so that a load conductor can be passed through the passage and current flowing therein sensed by the current sensor that is within the housing itself. This arrangement is seen as particular advantageous in the case of new installations where a main conductor (73) connecting the output terminal of an earth leakage unit (74) with a busbar feeding a series of trip switches (75) and an isolator (76) for the water heater can be easily routed through the passage (72) during the installation procedure. In this case it is irrelevant as to which circuit draws the current that would trigger the current sensor and the base level of current to be ignored by be current sensor would be selected according.

As shown most clearly in FIG. 9, the main conductor (73) passes through the housing (70) from the bottom to a busbar (77) at the top of a row of switches; into the isolator (76) at the top; out of the isolator at the bottom and into the top of the switch unit of the invention and thence out to the water heater.

Figure 10:
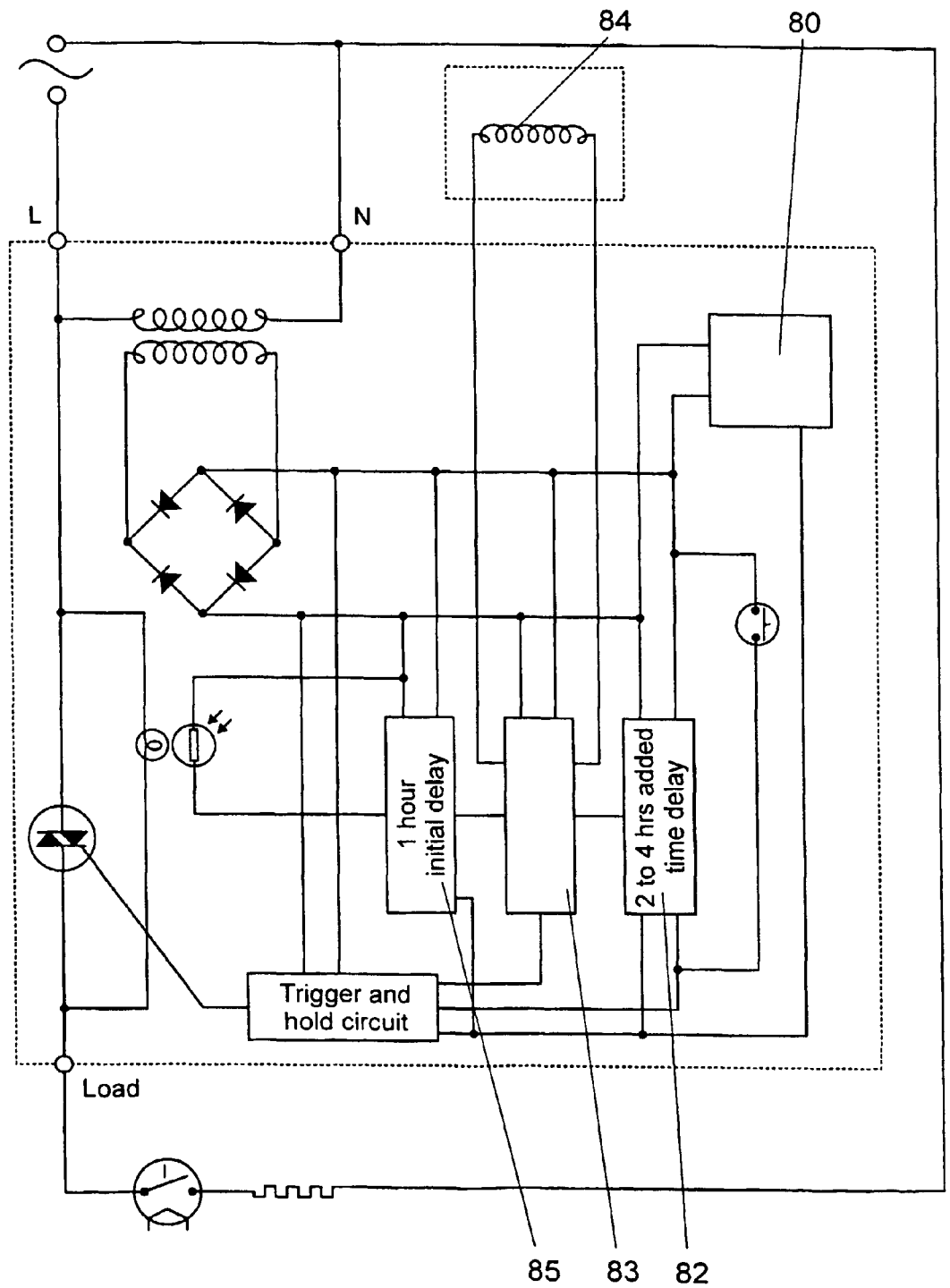
FIG. 10 is a circuit diagram similar to that of FIG. 1 but illustrating a presently preferred and more flexible timer means.

FIG. 10 shows a circuit in which all the time delays are controlled by a pulse generator (80) that generates pulses say, for example, at five-minute intervals, and the time delays are in effect counters of those five-minute intervals. In this particular instance an initial delay timer (81) times out over a period of about one hour. The main delay timer (82), once energised, is arranged to cooperate with the simple analyzer circuit (83) such that after an initial time delay of one hour and a main time delay of another two hours (three hours in total) the analyzer circuit checks to see if the current sensor (84) still senses current above the base level. In the event that it is still sensing such current, another one hour is timed after which the current sensor is checked once again, and only after a total main time delay of four hours (that is a total of five hours) is the trigger and hold circuit (85) triggered irrespective of the condition of the current sensor. This variation, it is envisaged, whilst being somewhat more complex, will further smooth out the power consumption of an individual dwelling, or the like. It will also, it is envisaged, smooth out the consolidated consumption of a multitude of dwellings fitted with such switch units.

Figure 11:
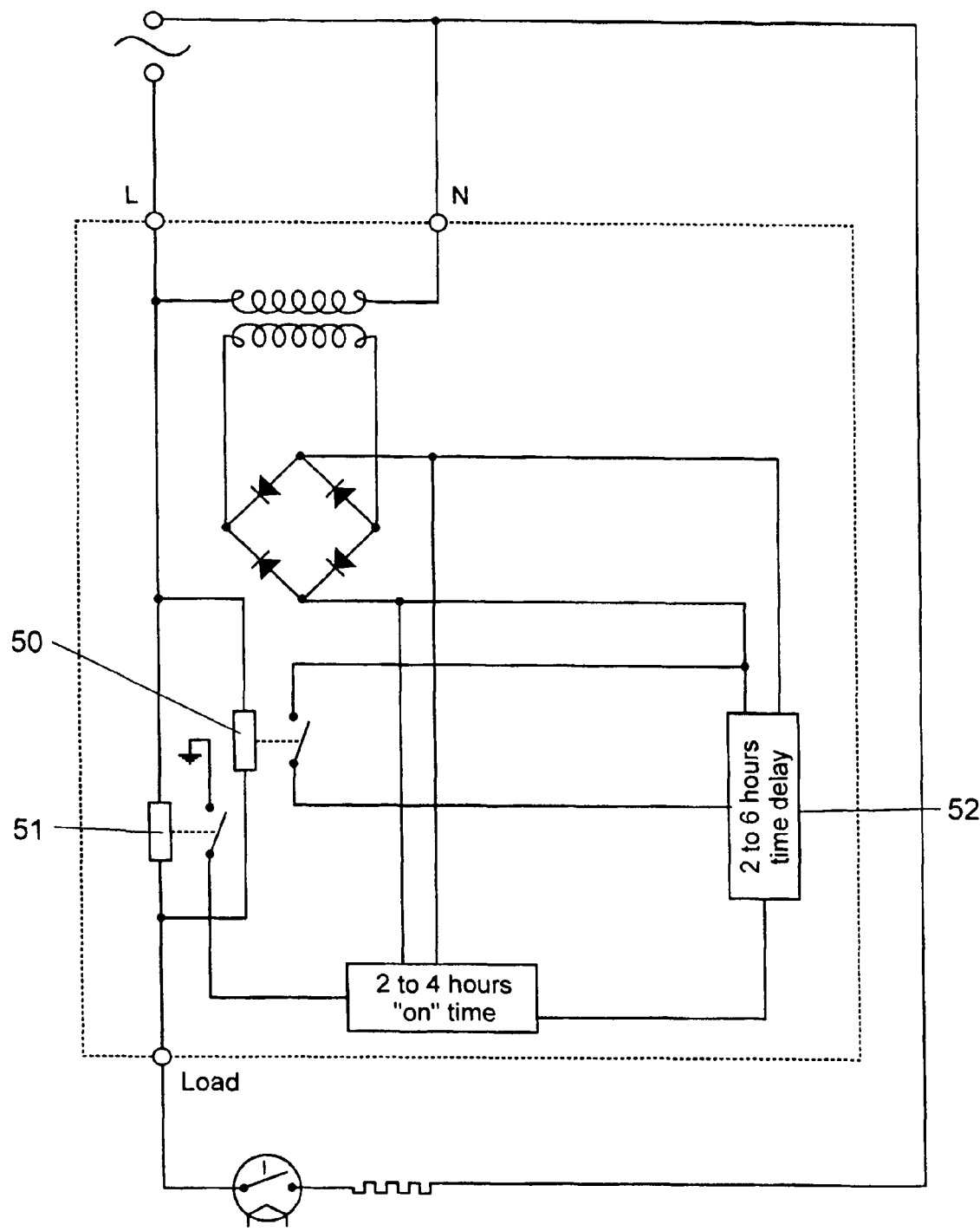
FIG. 11 is a circuit diagram similar to that of FIG. 1 but illustrating a simplified version as well as other variations thereto.

Another variation is that the detector circuit can include any electrical or electronic component that can provide a signal to the timer means and FIG. 11 illustrates a simple relay (50) being used for this purpose. FIG. 11 also illustrates a relay (51) being employed as the load switch as an alternative to a triac. FIG. 11 one also indicates the absence of the selection of different time delays and also the absence of an override switch. Still further, in the event that the water heater is adequately insulated to prevent excessive cooling over periods of a few hours, the initial delay timer can be omitted completely and only a time delay imposed by the main delay timer (52) activated immediately the thermostatic control switch closes. In such an instance, of course, the entire arrangement of the current sensor may be omitted. These variations are all illustrated in FIG. 11 that therefore illustrates a very much simplified embodiment of the invention that may well be appropriate in certain applications and, in particular, in certain demographic situations.

Figure 13:
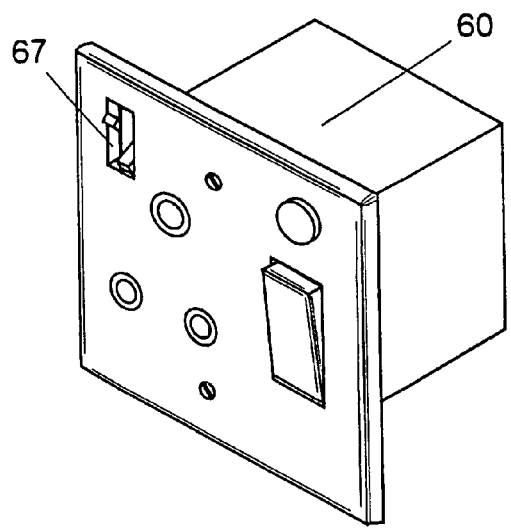
FIG. 13 illustrates, in isometric view, an electrical power supply outlet socket embodying a switch according to FIG. 12; and, FIG. 14 illustrates in similar view a separate plug-in switch unit for interfacing between an electrical supply socket and a plug of an electrical appliance.
Figure 14:
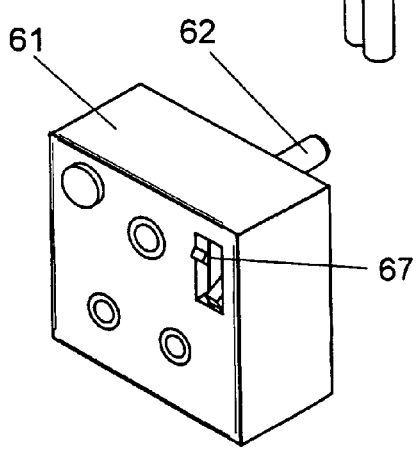
Figure 12:
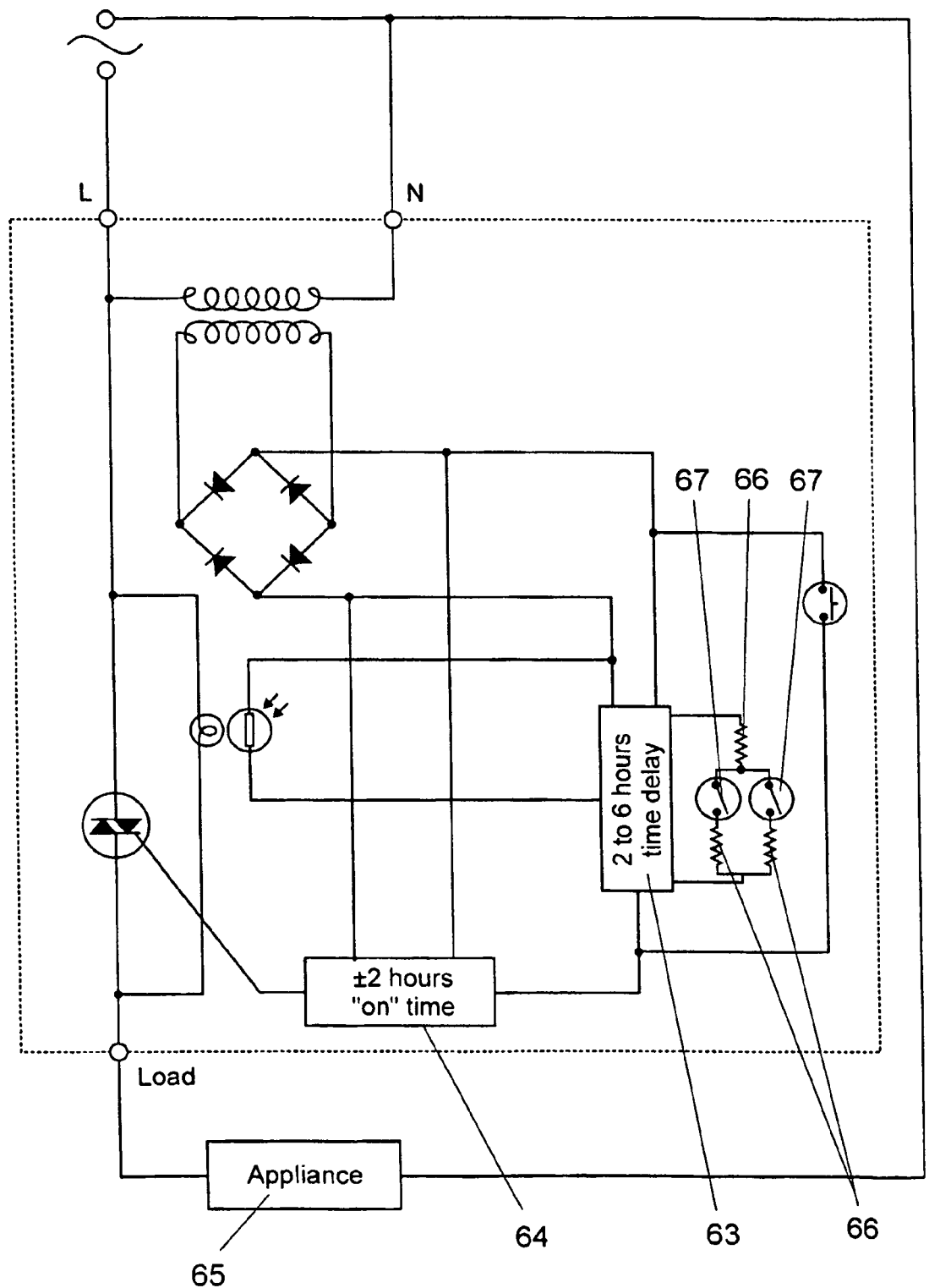
FIG. 12 is a circuit diagram of an alternative switch unit suitable for use in the second or third particular applications indicated above.

Turning now to the second and third applications of the invention indicated above, the switch unit (60) (see FIG. 13) in one case assumes the form of an electrical power outlet socket from a wall; and in the other case (see FIG. 14), the switch unit (61) assumes the form of a separate plug-in interface unit having electrically conductive pins (62) but otherwise being very much the same as the wall mounted socket. In either case, the circuit of the switch unit is illustrated in FIG. 12 and is of simplified form providing only a single delay timer (63) operating a trigger and hold circuit (64) in the absence of any current sensor and associated analyser circuit.

In such an instance the switch unit serves simply to delay the operation of an appliance (65), typically a washing machine, tumble dryer or dishwasher, by a period of time chosen to either operate the appliance when other appliances are "off", or operate the appliance at a later time that may be subject to off peak tariffs. A selection of time delays is provided utilizing an arrangement of resistors (66) as described with reference to FIG. 1 and wherein the time period is selected utilizing two microswitches (67) accessible that the front of the switch unit.

Numerous different applications and variations of the invention are possible within the scope hereof, the examples described above simply being illustrative of the operation of the invention.

The invention claimed is:

1. An electrical switch unit for controlling the supply of electrical energy to an appliance that also has its own electrical control switch for controlling operation of the appliance, the switch unit comprising:
   a live input terminal, and at least one of a neutral and an earth terminal for operative connection to an electrical power supply;
   at least a load output terminal for operative connection to an electrical appliance;
   a load switch selected from an electrically and an electronically operated load switch connected between the live input and load output terminals for opening and closing a load circuit between said live input and said load output terminals, and
   an electronic circuit embodying timer means for controlling the load switch,
   wherein the load switch is a normally open switch operatively closed by the electronic circuit, and
   wherein a bypass detector circuit is connected in parallel across the load switch, and
   wherein the timer means is operative to become activated consequent on the initiation of current flow through the detector circuit to effect closure of said load switch after a time delay (that is independent of real-time), and to maintain the load switch in a closed condition for a time period selected from a predetermined optionally adjustable time period a time period enduring until current flow through the detector circuit ceases after which the load switch is operatively returned to its normally open condition.

2. An electrical switch unit as claimed in claim 1 in which the predetermined optionally adjustable time period is from about one to about six hours.

3. An electrical switch unit as claimed in claim 2 in which the predetermined optionally adjustable time period is from about two to about five hours.

4. An electrical switch unit as claimed in claim 1 in which the timer means provides a manually operable selection between two, three, or four different time delays.

5. An electrical switch unit as claimed in claim 1 in which the said predetermined optionally adjustable time period for which the load switch is maintained in a closed condition is from about one to about four hours.

6. An electrical switch unit as claimed in claim 1 in which a manually operable override switch is associated with the switch unit to enable the said predetermined time delay to be selectively by-passed manually.

7. An electrical switch unit as claimed in claim 1 in which the switch unit has associated therewith a current sensor for sensing current in at least one conductor not associated directly with the output load terminal such that activation of the timer means to time out said optionally adjustable time delay is, after an optional initial shorter time delay, replaced by immediate closure of the load switch in circumstances in which the current sensor fails to sense a current above a predetermined base level in said at least one conductor not associated directly with the output load terminal during said initial shorter time delay.

8. An electrical switch unit as claimed in claim 7 in which the current sensor is embodied in the switch unit and the switch unit has a passageway for receiving at least one conductors passing through the switch unit in cooperating relationship relative to the current sensor.

9. An electrical switch unit as claimed in claim 7 in which the switch unit is adapted to be installed in an electrical distribution box in series with an electrical switch connected to supply electricity to an electrical water heater having its own thermostatically operated electrical control switch with the current sensor being associated with at least one electrical conductor connected to at least one other power circuit.

10. An electrical switch unit as claimed in claim 9 in which the switch unit has a housing that is configured for support in juxtaposed aligned relationship relative to a series of electrical control switches that generally includes an earth leakage unit, at least one water heater switch, and a series of trip switches.

11. An electrical distribution box including an electrical switch unit as claimed in claim 10.

12. An electrical switch unit as claimed in claim 1 in which the switch unit is configured as a separate plug-in unit to an electrical supply outlet socket to interface between the socket and a plug for supplying electrical energy to an appliance in which case it has conductive pins for cooperation with the socket on one face and a socket for receiving a plug associated with an appliance on another face.

13. An electrical switch unit as claimed in claim 1 in which the switch unit is built into an electrical power supply outlet socket (60).

14. An electrical supply system in which a multitude of consumers are supplied from an electrical supply and wherein at least some of the consumers have premises having an electrical installation in which there is embodied at least one switch unit as claimed in claim 1.

\* \* \* \* \*